United States Patent Office 3,399,777
Patented Sept. 3, 1968

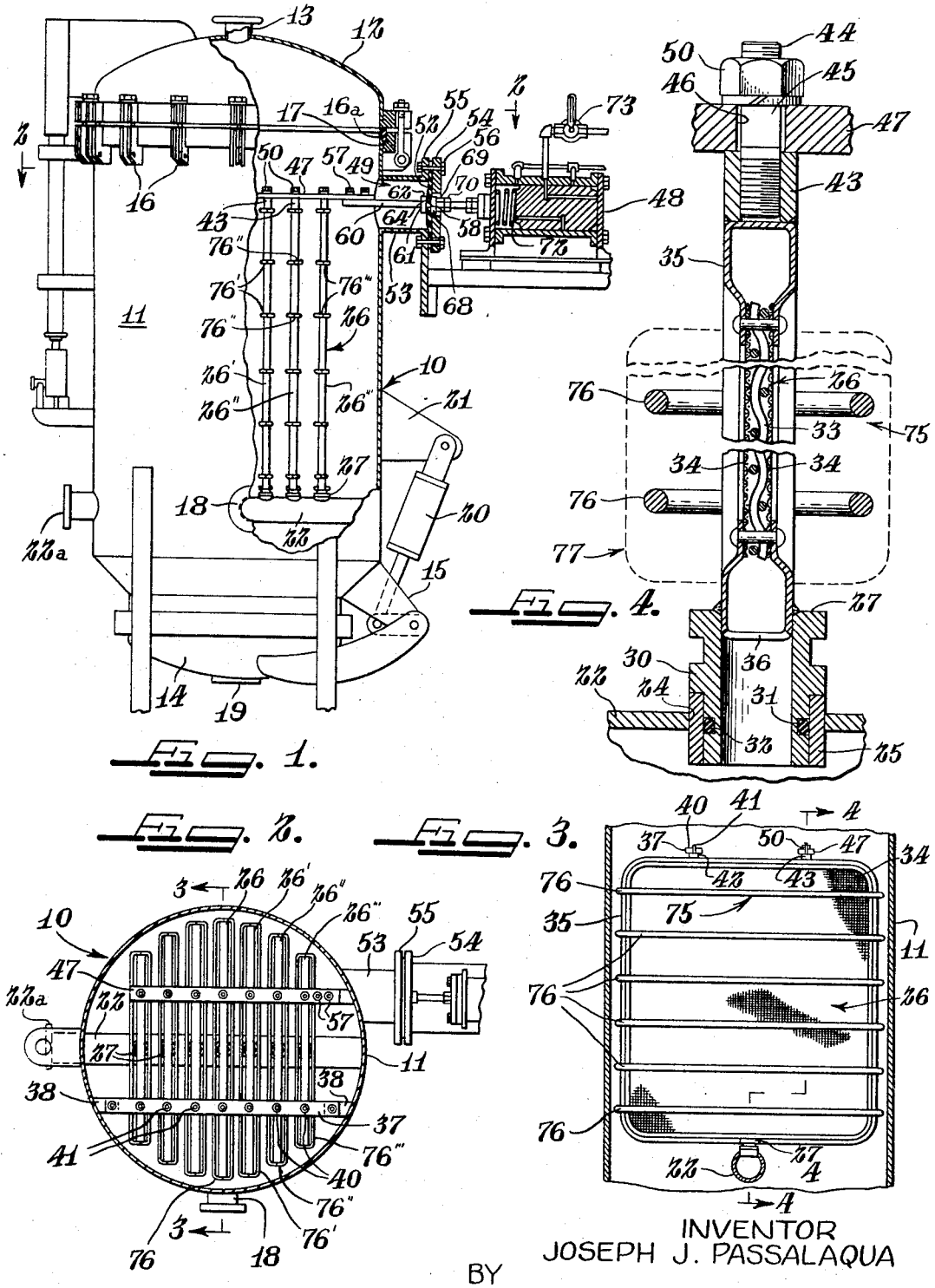

3,399,777
FILTER CAKE STABILIZING AND CLEANING MEANS
Joseph J. Passalaqua, Libertyville, Ill., assignor to Industrial Filter & Pump Mfg. Co., Cicero, Ill., a corporation of Illinois
Filed May 6, 1965, Ser. No. 453,759
14 Claims. (Cl. 210—332)

ABSTRACT OF THE DISCLOSURE

The improvement to multiple, spaced wall type, vibrated filter elements, comprising a plurality of spaced stabilizer bars attached to the filter element frames constructed to stabiilze the filter element cake during filtering and drying operations and to resonate and aid in removing the cake during vibration of the filter elemnts.

---

The present invention relates to filtering apparatus and more particularly to apparatus for stabilizing the filter cake on hollow filter leaves and which may be used to assist in removing the filter cake therefrom. The present invention is an improvement over the application of Henry Schmidt, Jr., and James F. Zievers, Ser. No. 222,258, filed Aug. 31, 1962, now U.S. Patent No. 3,212,-643, and assigned to the same assignee as the present invention.

Filtering apparatus of the type with which the present invention is primarily concerned generally comprises a plurality of spatially arranged, hollow filter leaves which are connected to a common outlet manifold. The leaves, which are perforated, are supported within a hermetically sealed tank and the liquid to be filtered is pumped into the tank under pressure. As the liquid passes through the leaves into the outlet manifold, the particles to be removed from the liquid are forced against the filter leaves or against a porous precoat layer previously built up thereon, and being too large to penetrate the precoat layers and/or the leaves themselves the particles are deposited on the perforate faces of the filter leaves. The particles which are thus removed from the liquid form a porous filter cake which must be removed from the leaves when it becomes sufficiently thick to interfere with the efficient operation of the filter.

In some applications, maximum efficiency is realized by permitting relatively thick cakes to build up on the filter leaves, and as such filter cakes fill out forming what might be termed relatively thick cakes. Anything over one inch is considered relatively thick in this art. Accordingly, as the filter cake in such an application fills out towards its maximum depth, it would normally be unstable with fluctuations in flow and/or pressure across the hollow filter leaf and would tend to slip vertically downward thus opening a portion of the leaf to penetration of the entrained solids. It would be desirable, therefore, to provide means for stabilizing the filter cake on the leaf.

Furthermore, certain types of filter cakes when blown down with gas at ambient or high temperatures crack and fall away from the leaf. It would be desirable, therefore, to provide means for holding the cake in place or the box during blow down.

During the operation of the filtering apparatus the effluent passes through the filter cake so that when the filtering apparatus is initially shut down for cleaning, the fitler cake is moist or wet and can be removed from the leaf in several ways such, for example, as by spraying a liquid stream against the cake or by reversing the flow of liquid through the chamber. In both instances, the filter cake is broken up and suspended in a liquid before it is discharged from the chamber. This is called a wet cake discharge operation, and although the filter cake may be removed in this manner, there are instances when it is desirable to remove the filter cake from the tank in a relatively dry state. This is called a dry cake discharge operation.

In order to perform a dry cake discharge, the cake is first blown down to remove any liquid which may be trapped therein. Thereafter the cake may be separated from the leaf by a manual scraping operation, but the more common procedure is to vibrate the leaf in the manner disclosed in the above referenced Schmidt and Zievers patent. Where, however, the cake is such as to tenaciously adhere to the leaf, the prior art practice has been to utilize the manual scraping technique. Because of the many disadvantages attendant with such a manual operation, it would be desirable to provide a method and means for enhancing the effectiveness of the vibrating apparatus of the Schmidt and Zievers patent thus permitting its use with a greater variety of cakes.

Therefore, a principal object of the present invention is to provide a new and improved filtering apparatus which includes means for stabilizing a filter cake and the associated leaf.

Another object of this invention is to provide stabilizer bars for supporting the filter cake in the leaf and for aiding in the vibratory discharge of the filter cake by virtue of the resonance of the stabilizer bars.

Another object of the present invention is to provide new and improved filtering apparatus including automatic filter leaf cleaning mechanism comprising filter cake stabilizer and vibratory means therefore, wherein the filtering apparatus is suitable for use with highly corrosive liquids and at relatively high pressures.

A principal feature for accomplishing the objects of this invention is to provide an improved hollow filter leaf having one or more stabilizer bars affixed to the periphery of the leaf by suitable means such as welding or clamping. It is preferred that the stabilizer bars shall have a diameter equal to about 10 or 15% of the anticipated filtered cake depth which normally may be within the range of one inch. The stabilizer bars preferably project outward from the filter leaf surface about 80% of the anticipated filter cake depth. It is preferred that the stabilizer bars of this invention are positioned vertically with respect to one another, all in a horizontal plane, substantially every six times the anticipated filter cake depth in vertical height and for a conventional filter leaf would be substantially six inches apart. The filter cake stabilizer means, preferably in the form of a bar, is anchored to the filter leaf so that the filter cake is stabilized toward the end of the filter cycle and during a subsequent blown down of the filter cake.

The stabilizer bars may be of any suitable geometric shape in cross-section although it is preferred that they be circular, substantially one-quarter inch in diameter and of suitable material so the stabilizer means will resonate during high speed vibration of the filter leaf to aid in filter cake removal.

Additionally, the above and further objects are realized in accordance with this invention by providing filtering apparatus which includes a plurality of hollow filter leaves spatially disposed within a filter chamber and to which stabilizer means incorporating the features of this invention are operatively connected and the assembly of hollow filter leaves and stabilizer means therefore are operatively connected to a high speed reciprocator impactor.

The invention, both as to its organization and method of operation, together with further objects and advantages thereof, will best be understood by reference to the following detailed description taken in connection with the accompanying drawings, in which:

FIG. 1 is a side elevational view, partly in section, of a filtering apparatus embodying the stabilizer bars of the present invention for supporting and vibrating the filter cake formed on the hollow filter leaves of the filtering apparatus;

FIG. 2 is a sectional view of a portion of the apparatus of FIG. 1 taken along the line 2—2 thereof, looking in the direction of the arrows;

FIG. 3 is a sectional view taken along the line 3—3 of FIG. 2, looking in the direction of the arrows, illustrating a preferred filter leaf and stabilizing bars; and FIG. 4 is a cross-sectional view of one of the filter leaves taken along the line 4—4 of FIG. 3, looking in the direction of the arrows.

Referring now to the drawings and particularly to FIG. 1 thereof, there is shown a filter tank 10 comprising a cylindrical housing 11 over the top of which is provided a cover 12 having a centrally disposed vent 13. The bottom of the housing 11 is closed by means of a bottom cover 14 which is pivotally attached to the housing 11 by means of a hinge 15. Since the filter is operated at relatively high pressures, the top and bottom covers 12 and 14 include means such, for example, as sealing gaskets 16a (only visible at the top) for effecting a tight seal between the covers and the housing 11. During normal operation of the filter, including periodic cleansing thereof, the cover 12 remains secured to the housing 11 and, therefore, may be clamped in place by means of a plurality of suitable clamps 16 which are attached to the cover 12 and engage the lower edge of an annular flange 17 on the top of the housing 11. An inlet duct 18 is provided in the side of the tank 10 for admitting the liquid to be filtered into the chamber and a drain duct 19 is provided in the cover 14. When a dry cake discharge is used to clean the filter, the bottom cover 14 is moved out of engagement with the housing 11 by means of a pneumatically or hydraulically operated cylinder 20 which is operatively connected between the hinge 15 and a bracket 21 which is affixed to and extends from the outer wall of the housing 11.

As best shown in FIGS. 1 and 2, a plurality of hollow filter leaves 26 are arranged in spaced apart parallel planes within the tank 10 and respectively include tubular connectors 27 which depend into suitable apertures 24, FIG. 4, provided along the top of an outlet manifold 22. Referring to FIG. 4, a liquid tight seal is provided between the manifold 22 and the connectors 27 by means of bushings 25 which extend through the apertures 24 and are welded to the manifold 22 and an annular sealing gasket 31 which is disposed within an annular groove 32 in the outer wall of the connector 27. Shoulders 30, which are provided on each of the connectors 27 above the grooves 32, engage the upper edges of the bushings 25 and thus support the filter leaves 26 at an elevated position within the chamber. The manifold 22 extends diametrically across the chamber near the bottom thereof and includes a portion 22a, FIG. 1 and FIG. 2 which protrudes from the tank 10 and is suitably sealed thereto as by welding.

The filter leaves 26 are essentially of a type well known in the art and respectively comprise a continuous tubular frame 35 in which is clamped two fine wire or fabric screens 34 and a coarse wire screen or grid 33 which spaces the screens 34 apart. The connectors 27 are welded to the central portion of the bottom of the frames 35 of their respective filters and the frames 35 are provided with apertures 36 which connect the spaces between the screens 34 with the manifold 22 through the connectors 27. Liquid which is pumped into the filter chamber may thus pass through the screens 34 and into the manifold 22 for delivery to a location outside the filter.

In order to maintain the filter leaves 26 in spaced apart vertical planes, they are each attached at the top to a horizontally disposed guide bar 37 which extends across the chamber and is secured at its end to the tank 10 by any suitable means. However, in order to permit facile removal and replacement of the leaves 26, in the illustrated embodiment of the device of the aforementioned application, which forms no part of this invention with the exception of the novel combination of this invention with the aforementioned structure of that copending invention, the bar 37 is attached at its ends, by means of bolts, to a pair of brackets 38 which are welded to the inner wall of the tank 10. As shown, the bar 37 is mounted parallel with the manifold 22 toward one side of the chamber and includes a plurality of vertically extending apertures 40, FIG. 2, which are centrally spaced apart by distances equal to the center spacing between the apertures 24. Each of the leaves 26 includes an upstanding stud 41 FIG. 2 and FIG. 3, which loosely extends through its associated aperture 40, and the studs 41 are threaded into the threaded bore of the respective connector and spacer bushings 42 which are welded to the upper cross members of the frames 35, as illustrated with respect to similar construction of FIG. 4. The leaves 26 are maintained in substantially parallel planes by means of an impactor bar 47, FIG. 2, which is substantially parallel to the bar 37 and is fixedly attached to each of the leaves 26. As is described in greater detail hereinafter, impactor bar 47, FIG. 1 and FIG. 2, FIG. 3 and FIG. 4, primarily functions to directly connect the leaves 26 to a reciprocatory impactor or vibrator 48. Therefore, in order to connect the bar 47 to leaves 26, a plurality of threaded bushings 43 are respectively welded to the top cross members of the leaves 26 and connectors 44 are threaded into the bushings 43. Both ends of the connectors 44 are threaded and the unthreaded central sections 45 thereof are positioned within apertures 46 provided in the bar 47 and nut and lock washer assemblies 50 fixedly secure to the studs 44 to the bar 47. During removal of the filter cake from the leaves 26, the bar 47 is reciprocably impacted along its principal longitudinal axis by means of the reciprocatory impactor means or vibrator 48 which is mounted on shock absorbers, shown schematically, on a suitable platform mounted on the outside of the tank 10 and is connected to the bar 47 by means of a connector assembly 49 mounted in the wall of the tank 10.

The connector 49 must operate under extreme conditions of operation which includes using the filter 10 in conjunction with highly corrosive liquids, operating the filter at relaitvely high pressures, and operating the impactor 48 at a frequency of between 2500 and 4000 cycles per minute. Consequently, such convention sealing devices as stuffing boxes are unsuited for use with the connector 49.

In accordance with the present invention, the stabilizing means in the form of stabilizer bars is affixed to pressure filter leaves to support the filter cake. When the filter cake has reached a predetermined thickness, the filter cake is removed by reciprocably impacting the filter leaves by means of reciprocatory impactor means 48, as disclosed and claimed the aforementioned pending application. It is also necessary that a suitable seal such as disclosed in the aforementioned application should be provided through which the reciprocatory impacts may be transmitted and which is relatively unsusceptible to the various types of corrosive liquids which may be supplied to the filter 10. Therefore, the connector 49 includes a diaphragm type sealing gasket 52, formed of rubber or other suitable flexible material, which is mounted over the end of a tubular connector 53 which surrounds an aperture in the wall of the tank 10. As illustrated, the aperture is in axial alignment with the impactor bar 47.

The disk-like gasket 52 is shown in FIG. 1 in a deformed condition, its normally released position, however, being substantially planar. The outer diameter of the gasket 52 is substantially greater than the internal diameter of the tube 53 and is pressed against an annular flange 55 on the tube 53 by means of a circular back-up plate 54. Where necessary, the gasket 52 may be provided with one or more annular ribs (not shown) which engage the faces of either or both of the flanges 55 and the plate 54. In asembling the unit, the gasket 52 is compressed between the flanges 55 and the plate 54 by means of a plurality of bolts 56 which are outwardly displaced from the periphery of the gasket 52. In this manner, apertures or other strain creating irregularities need not be provided in the gasket 52 in order to permit mounting thereof.

The impactor bar 47 is axially aligned and fixed secured by means of a plurality of bolts 57 to a rod 60 which extends through a central aperture 58 in the gasket 52 and is connected externally of the tank 10 to the impactor 48. As disclosed in the aforementioned copending application, rod 60 is provided with a circular end on the reduced cross section terminating in a shoulder 61 against which a washer-like bushing 62 abuts. The thickness of the hub of the gasket 52 is enlarged to provided a pair of annular beads, more particularly illustrated in the aforementioned application, one of the beads being partially received in an annular recess in the bushing 62 and the other bead being partially received in a similar annular recess in a bushing 68, a bushing 68 being slidably positioned over the reduced portion of the rod 60. A pair of nuts 69 and 70 threadedly engage a threaded portion of the bar 60 and are used for compressing the hub between the bushings 62 and 68 and for locking the bushings 62 and 68 in this position. The aforementioned disclosure is more particularly illustrated in the copending application. Since it is particularly important that the sealing gasket 52 not be strained during installation thereof, or during the cleaning operation, when it is rapidly flexed back and forth, the hub is appreciably thicker in cross-section than the remainder of the diaphragm 52 and the thickness of each of the beads (not shown) exceeds the depth of the recesses (not shown). Therefore, as the bushings 62 and 68 are pressed toward one another by rotation of the nut 69 on the rod 60, only the hub (not shown) is compressed, the body portion of the gasket 52 remaining unstressed. In this manner, the hub (not shown) is compressed against the rod 60 to effect a good pressure tight seal and no strain whatsoever is established in the body of the gasket 52. Therefore, the life and reliability of the gasket 52 are not impaired not only in the construction of the aforementioned application but also as used in conjunction with the stablizing means for the filter cakes and the operation thereof of this invention.

The outwardly extending end of the rod 60 may be attached by any suitable means to the frame of the vibrator 48 in axial alignment with the piston thereof since there is no sealing problem on the outside of the gasket 52.

The impactor 48, as used in connection with the aforementioned application for vibrating the filter leaves 26, is also used in conjunction with the improved filter leaves of this invention incorporating the stabilizer means for supporting the filter cake and more particularly with the vibrating discharge of the filter cake, and it is of the floating piston type, some times called a vibrator, in which the piston is biased in one direction by a spring 72, and the bar 60 is attached, as by welding, to the adjacent face of the impactor 48. Since such impactors are well known in the art and commercially available, the impactor 48 is not described in detail. It should be understood, however, that as air is supplied thereto under pressure, the piston reciprocates within the cylinder and strikes the ends thereof while traveling at its maximum speed. In this manner reciprocatory impacts of great force and frequency are applied not only to the filter leaves 26 as disclosed and claimed in the aforementioned copending application but equally as well in the reciprocatory impacts of great force and frequency as are applied to the filter leaves 26 for setting in motion the stabilizing means of this invention in the removal of the filter cake, and which as the filter cake is forming supports the filter cake in position, and the filter leaves.

FIGS. 1, 2, 3 and 4, a preferred embodiment of the stabilizing means 75 which comprises a plurality of vertically spaced stabilizer bars 76 is illustrated. Referring to FIG. 1 and FIG. 2, it is to be noted that there are symmetrically arranged similar filter leaves, 26', 26'', 26''' about the center and largest filter leaf 26. The filter leaves are thus arranged to obtain the maximum filtering area with respect to a vertical cylindrical filtering apparatus of this type as disclosed in the aforementioned copending application. The central filter leaf 26 is substantially 44" wide by 42" high. It is to be noted that the vertical height of each filter leaf is the same, the only variation being with respect to the widths of the similarly formed filter leaves. Therefore, the description with respect to the filter leaves will be described with reference to the central filter leaf 26 and the like and primed referenced characters will indicate the same or similar parts. The stabilizer bar 76 within the scope of this invention may be used in either a vertical tank filter such as it is illustrated with or a horizontal tank filter, both being of the leaf type. In this embodiment, the vertically spaced stabilizer bars 76 are in the shape of an elongated rectangle as illustrated in FIGS. 1, 2 and 3 and the enlarged view of FIG. 4 wherein the length of the stabilizer bar 76 is slightly more than the width of the continuous tubular frame 35 of the filter leaf to which it is affixed by suitable means such as by welding or clamping using suitable securing means to retain the stabilizer bar 76 at its predetermined position with respect to the filter leaf. The length of each rectangularly shaped stabilizer bar is respectively proportional to the width of the symmetrically formed filter leaves 26', 26'', and 26'''. The width of the stabilizer bar 76 as best illustrated in the enlarged view of FIG. 4, is in the preferred embodiment substantially 2" and symmetrically arranged with respect to the vertical center line of the hollow filter leaf 26. The stabilizer bars are made of suitable material particularly compatible with the process liquid. Where, for example, "Diamond Alkali" liquid is used the bars 76 may be formed of No. 304 stainless steel or Nichrome steel or other alloys. The stabilizer bars are preferably circular in cross-section and they have a diameter equal to about 10 or 15% of the anticipated filter cake depth which normally in this particular apparatus is substantially ¼". The stabilizer bars project outward from the filter leaf surface to about 1" which is substantially 80% of the anticipated filter cake depth of substantially 1¼". The stabilizer bars 76 are positioned vertically as illustrated in FIGS. 1, 3 and 4, each in a horizontal plane and positioned approximately every six times the anticipated filter cake depth and in this instance, substantially 6" in vertical height. With the stabilizer bars 76 constructed in this manner and affixed to the filter leaf, the filter cake 77, FIG. 4, is stabilized toward the end of the filtering cycle and during any subsequent blow down of the filter cake 77.

A preferred form of stabilizer bar 76 has been particularly described as being rectangular in shape and formed from rod-like materials, though it is to be understood that such stabilizer bars may be in the form of any other suitable geometric shaped cross-sectional areas or of any suitable deformed shape and of such shape and material that the stabilizing bars 76 when properly arranged on a filter leaf and subjected to high speed vibration of the filter leaf will resonate and actually aid in the filter cake removal.

Although the preferred form of the stabilizing means 75 and the stabilizing bars 76 has been disclosed, it is within the scope of the invention that the filter leaf may be in any other suitable geometric form such as square or circular in shape to obtain the maximum filtering efficiency with the shape of the filtering apparatus in which the filtering leaves may be operatively mounted. Although the preferred embodiment of the stabilizer means and/or stabilizer bar is of an elongated rectangular shape and horizontally mounted with respect to the filter leaf 26, it is to be understood that it is within the scope of the invention that the stabilizer bars may be otherwise to act as tuning forks and thus resonate during removal of the filter cake. Although the preferred embodiment is simple to manufacture other arrangements will suggest themselves within the scope of the invention. In the preferred embodiment, the rod-like material forming each stabilizer bar is preferably welded on both sides of the tubular frame 35 and across the face where affixed, projected preferably about an inch outward from the filter leaf surface. Each of the stabilizer bars is preferably within the range of from 1/8″ to 1/4″ in diameter and/or thickness depending upon the shape of the stabilizer bar.

In the operation of the filtering apparatus comprising the stabilizer means of the preferred embodiment of the invention which serves to stabilize the filter cake during the filtering operation, and which aids in removal of th filter cake during high speed vibration, the stabilizer means resonates and aids in the filter cake removal. The filter leaves 26, the bar 47, the bar 60 and the impactor 48 form a unitary structure with the bars 47 and 60 being in alignment with the axis of reciprocatory impacting of the impactor 48 to provide a maximum transfer of the force of impact to the filter leaves 26. Therefore, as the piston of the impactor 48 reciprocates and strikes the opposite ends of its cylinder, the reciprocatory impacts are transmitted directly to the filter leaves 26 and to the vertically spaced stabilizer bars affixed to the respective filter leaves of the filtering apparatus to set up vibrations therein which shake the filter cake loose from each of the filter leaves 26. In order to improve efficiency of the transmission of the reciprocatory impacts, shock absorbers 78 and/or vibration dampening means is positioned between the impactor 48 and the support therefore affixed to the housing 11 and prevents transmission of the vibrations to the housing but instead effectively to the filter leaves 26 and their respective stabilizer means 75.

Considering a typical cycle of operation of the filtering apparatus, with the covers 12 and 14 rlosed and all of the lines to and from the tan 10 with the exreption of the vent line 13 and the inlet dust 18 closed by suitable valves (not shown), a liquid is pumped from a slurry tank into the filter chamber through the inlet duct 18 while the vent 13 is also connected to the slurry tan. When the filter chamber has been filled so that the liquid is returning to the slurry tank through the line connected to the vent 13, a precoat powder of suitable material is added to the liquid in the slurry tank in a predetermined measured amount. The vent 13 is then closed and a connection between the outlet manifold 22 and the slurry tank is opened so that the liquid from the precoat tank with the precoat filter powder suspended therein is now pumped through the screens 34 into the manifold 22 and back to the slurry tank. The flow of the precoat liquid through the screens 34 causes the precoat powder to bridge over the fine mesh openings in the screen 34 causing an even cake to build up on both sides of each of the leaves 26. The precoat powder is so shaped as to effect a porous cake which includes minute openings through which the clear liquor may flow but which prevents the passage therethrough of the powder. The precoat powder size may thus be used to determine the size of the suspended solids which may be present in the filtered liquor which is pumped out through the outlet manifold 22 during the filtering cycle. When a sufficiently thick cake of precoat powder has been built up on the screens 34, the line from the inlet duct 18 to the slurry tank is closed and connected to the source of liquid to be filtered. If the manifold 22 had been connected to the slurry tank at this time, it is now connected to the line in which the filtered liquor is to be supplied to a suitable reservoir or other process tank. The liquid requiring filtration is now pumped into the duct 18 and the effluent is discharged to a process or storage tank, the suspended solids in the liquid being filtered out on the outside of the precoat filtered cake. As the filter cake builds out, then on relatively thick filter cakes and anything over 1″ is considered relatively thick, so that as the filter cake extends out towards its maximum depth and would normally be unstable with fluctuations in flow and/or pressure across the filter leaf, the filter cake would tend to slip vertically downwardly. However, with the stabilizing means 75 comprising the vertically spaced stabilizer bars 76 operatively affixed to the filter leaf, stabilizing influence of the filter cake is now performed by the stabilizer means and the respective stabilizer bars. Furthermore, when a great many filter cakes are blown with gas at ambient or high temperatures they crack and fall away. However, the stabilizer bars 76 serve to prevent this occurrence, and the stabilizer means stabilizes the filter cake during the blow. In those instances in which the suspended solids in the liquid to be filtered tend to blind the filter cake, i.e., to build up a filter cake which is impervious to the passage of liquid, a body of filter aid powder may be introduced with the influent in the influent tank or in the line to the duct 18. This will maintain a porous cake and prolong the filter cycle which is also additionally brought about by the stabilizer means.

When the flow rate through the filter slows down to an inefficient rate which is caused by the build-up of a relatively thick filter cake on the filter leaves 26, which condition can be determined by the pressure within the filtering chamber, the filter cake must be removed. In order to do this, the supply of liquid to the chamber through the duct 18 is terminated and compressed air may then be introduced into the chamber through the vent 13 until the level of liquid in the chamber is below the bottom of the screens 34. The remaining liquid in the tank is then drained through the drain line 19 and the cover 14 is opened by means of the pneumatic cylinder 20. The flow of compressed air through the filter cake causes a sufficient drying thereof so that a dry discharge may then be effected in accordance with the teachings of the aforementioned application.

With the bottom cover 14 thus open, a suitable container is placed beneath the tank 10 and the impactor 48 is set into operation by means of a suitable control valve 73. As previously disclosed in the aforementioned application, the most efficient removal of the filter cake takes place when the impactor 48 is operated at a frequency of between 2500 and 4000 cycles per minute. The bar 47 is then reciprocably impacted by means of the impactor 48 and reciprocates through an amplitude of approximately one-eighth of an inch and at the above prescribed frequency. This causes the filter leaves 26 together with the stabilizer means and/or the stabilizer bars to be impacted and vibrated so that all or at least portions thereof vibrate at their resonant frequencies or harmonics thereof to quickly remove all of the filter cake from the screens 34. Therefore, the stabilizer bars of the stabilizer means in addition to the strength for supporting the filter cake, the resonance of the stabilizer bars during vibration actually aids in the vibrating discharge of the filter cake. Therefore, the high speed vibration of preferably about 2800 cycles per minute is transferred to the filter cake stabilizer bars 76 and they in turn vibrate to quickly break up the filter cake. Removal of the filter cake in this manner requires only a few seconds. The cover 14 is then returned to a closed position, and the filter leaves 26 are once more provided with a precoat layer as described above.

In the event that a wet discharge of the filter cake is required, the filter is cleaned by simply shutting off the inlet and outlet valves, operating the impactor 48 for a few seconds, and draining off the liquid from the chamber through the drain line 19. Moreover, where a dry cake discharge is used, more efficient cleaning may be provided by following the dry discharge with a wet discharge, i.e., when the chamber is first filled with the liquid from the slurry tank after the dry cake discharge, the impactor 48 is set into operation for a few seconds which causes any small portions of the cake which remain on the filter leaves 26 to be suspended in the liquid and thereby to insure an even build-up of a filter cake on the screens 34.

The present invention thus provides a filtering apparatus which includes stabilizer bars acting in cooperation with means in the form of a reciprocatory impactor or vibrator to effect a very satisfactory removal of the filter cake either in wet or dry form.

While the invention has been described by means of particular embodiments thereof, it will be understood that those skilled in the art may make many changes and modifications without departing from the true spirit and scope of the invention, and accordingly, all such changes and modifications which fall within the true spirit and scope of this invention are intended to be covered in the appended claims.

I claim:

1. Apparatus for removing the filter cake from a plurality of pressure type hollow filter leaves including stabilizer bars for supporting the filter cake, each of said hollow filter leaves including a rigid frame and stabilizer bars affixed to the rigid frame, and a porous filtering member connected across said rigid frame, said apparatus comprising a pressure tank enclosing a filter chamber, an effluent exhaust manifold supported by said tank in said filter chamber, said filter leaves and stabilizer bars being mounted in face-to-face relationship on said manifold with the cavities in said leaves being in communication with an outlet passageway in said manifold, a rigid, substantially straight impactor bar extending perpendicularly to the planes of said filter leaves, and stabilizing bars, positive acting connector means fixedly and immovably connecting the frames of each of said filter leaves and stabilizer bars to said impactor bar at spaced apart locations remote from said manifold, said connector means preventing relative movement between said filter leaves and stabilizer bars and said impactor bar at the locations at which the filter leaves and stabilizer bars and the impactor bar are respectively connected together, impacting means fixedly connected to said impactor bar for imparting axially directed shock waves to said impactor bar for transmission by said bar to said filter leaves, and stabilizer bars thereof and support means for supporting said impacting means independently of said filter leaves and stabilizer bars, whereby said filter leaves and stabilizer bars, said impactor bar and said impacting means constitute a unitary assemblage of fixedly and immovably interconnected parts in which said impacting means is supported independently of said filter leaves and stabilizer bars.

2. An apparatus as set forth in claim 1 wherein said impacting means is adapted repeatedly to impact said impactor bar to induce axially directed shock waves therein at substantially the resonant frequency of said filter leaves and stabilizing bars therefor.

3. As an article of manufacture, a pressure filter leaf for a filtering apparatus including an outlet manifold, comprising a substantially rectangular tubular frame including oppositely arranged vertical and top and bottom horizontal tubular portions operatively interconnected, said bottom horizontal tubular portion including a tubular connector adapted to be operatively connected to and disconnected from the outlet manifold, and stabilizer means affixed to the opposite vertical tubular portions of the pressure filter leaf, whereby the filter cake formed on the opposite filtering faces of the filter leaf is stabilized during the end of the filter cycle and during a subsequent gas blow of the filter cake during the blow of the filter cake with the pressure filter leaf operatively connected to the outlet manifold.

4. As an article of manufacture, a pressure filter leaf for a filtering apparatus, said pressure filter leaf comprising a continuous tubular frame of a predetermined geometrical shape, stabilizer means mounted with at least a portion thereof extending in parallel spaced-apart relationship to at least one filtering face of the filter leaf, said stabilizer means having at least one dimension substantially equal to within the range from substantially 10 to 15% of the anticipated filter cake depth built up on the filter leaf during the filtering operation within the filtering apparatus.

5. As an article of manufacture, a pressure filter leaf for a filtering apparatus, said pressure filter leaf comprising a continuous tubular frame of a predetermined geometrical shape, a plurality of stabilizer bars affixed to opposite portions of the filter leaf, said stabilizer bars having at least one dimension substantially equal to within the range from substantially 10 to 15% of the anticipated filter cake depth built up on the filter leaf during the filtering operation within the filtering apparatus, and said stabilizing bars projecting outward from a filter leaf surface about 80% of the predetermined filter cake depth.

6. As an article of manufacture, a pressure filter leaf for a filtering apparatus, said pressure filter leaf comprising a continuous tubular frame of a predetermined geometrical shape, a plurality of stabilizer bars affixed to opposite portions of the filter leaf, said stabilizer bars having at least one dimension substantially equal to within the range from substantially 10 to 15% of the anticipated filter cake depth built up on the filter leaf during the filtering operation within the filtering apparatus, and said plurality of stabilizer bars operatively affixed in horizontal planes, substantially six times the anticipated filter cake in vertical height.

7. As an article of manufacture, a pressure filter leaf for a filtering apparatus, said pressure filter leaf comprising a continuous tubular frame, stabilizer means affixed to the opposite sides of the said frame, whereby the filter cake formed on the opposite filtering faces of the filter leaf is supported during the filtering operation within the filtering apparatus, and said stabilizing means operatively affixed to the filter leaf for resonating the filter cake during the removal thereof.

8. Apparatus for supporting and removing built-up filter cake on and from filter leaves, said apparatus comprising a plurality of stabilizer bars operatively affixed to each of said filter leaves and adapted for resonating the filter cake in the removal thereof from the filter leaves, impactor means for directing shock waves to said filter leaves and the stabilizer bars thereof, and said stabilizer bars operatively related to each of said filter leaves and said impactor means for applying the shock-waves to the filter cake supported by the filter leaves and the stabilizer bars of said filter leaves in the removal of the filter cake.

9. Apparatus for supporting and removing filter cakes on and from filter leaves, comprising: a plurality of elongated stabilizer bars; each of said stabilizer bars being mounted in parallel spaced-apart relationship to at least one filtering face of a filter leaf over a portion of its length, whereby said stabilizer bars support a filter cake at points remote from said filter leaves during operation of the filter; and impactor means for directing shock waves to said stabilizer bars, whereby the filter cake is removed due to the vibrations caused by said shock waves.

10. The apparatus of claim 9 in which said impactor means includes a shock wave transmitting means having its operative end positioned orthogonally to said parallel spaced-apart portions of said stabilizer bars, whereby said parallel spaced-apart portions are vibrated by said shock waves about the point at which they are mounted.

11. Apparatus in accordance with claim 10 in which said impactor means includes a means for imparting said shock waves at the resonant frequency of said stabilizer bars.

12. As an article of manufacture, a pressure filter leaf for a filtering apparatus comprising
a continuous frame, a pair of perforate filter cake supporting facial surfaces extending across said frame in spaced apart, parallel relationship, a plurality of filter cake stabilizer members secured to said frame and extending across said filter cake supporting facial surfaces in spaced apart relationship therewith to be embedded in said cake during a filtering operation, whereby said stabilizer members help to support said cake on said leaf during a filtering operation and help to break up said cake when said leaf is vibrated to dislodge said cake therefrom during a cleaning operation.

13. Apparatus for stabilizing the filter cakes deposited on a plurality of vertically disposed pressure type hollow filter leaves mounted in face-to-face relationship in a pressure tank and for breaking up said cake during a cleaning operation, each of said leaves including a rigid frame having at least one perforate facial surface extending across said frame for receiving said cake during a filtering operation as the liquid being filtered flows into said leaf through said perforations in said surface, and means for vibrating said leaves to remove said cake therefrom during said cleaning operation, the improvement comprising, a plurality of filter cake stabilizer bars extending horizontally across the perforate surfaces of said leaves in spaced apart relationship with said perforated surfaces so as to be embedded in said cakes when they are deposited on said perforate surfaces and to be vibrated relative to said cakes when said leaves are vibrated during said cleaning operation.

14. The invention according to claim 13 wherein said stabilizer bars are spaced from said perforate surfaces by a distance equal to about 80 percent of the thickness of the filter cake at the commencement of said cleaning operation.

References Cited

UNITED STATES PATENTS

| 1,940,993 | 12/1933 | Borden | 210—333 X |
| 2,285,048 | 6/1942 | Palkin | 210—346 |
| 2,568,085 | 9/1951 | Naugle | 210—333 |
| 2,886,178 | 5/1959 | Davis et al. | 210—333 |
| 3,212,643 | 10/1965 | Schmidt, et al. | 210—332 |
| 3,310,175 | 3/1967 | McLagan | 210—332 X |

REUBEN FRIEDMAN, *Primary Examiner.*

F. SPEAR, *Assistant Examiner.*